T. W. Brown,
Ash Sieve
Nº 47,615.    Patented May 9, 1865.
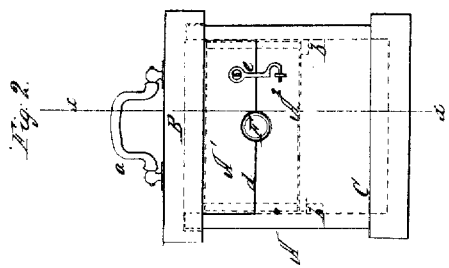
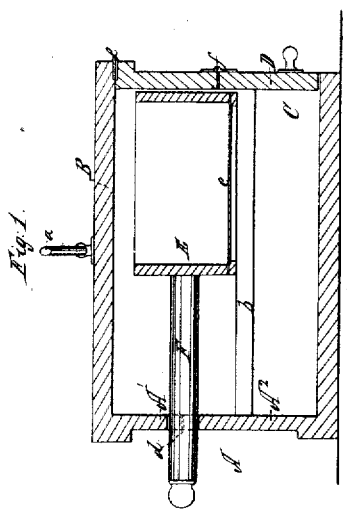
Witnesses:                                Inventor:

UNITED STATES PATENT OFFICE.

T. W. BROWN, OF CAMBRIDGE, MASSACHUSETTS.

ASH-SIFTER.

Specification forming part of Letters Patent No. 47,615, dated May 9, 1865.

*To all whom it may concern:*

Be it known that I, T. W. BROWN, of Watertown, in the county of Middlesex, and State of Massachusetts, have invented a new and useful Improvement in Ash-Sifters; and I do hereby declare that the following is a full, clear, and exact description thereof, which will enable others skilled in the art to make and use the same, reference being had to the accompanying drawings, forming part of this specification, in which—

Figure 1 is an elevation of a section of my ash-sifter taken on the line $x$ of Fig. 2. Fig. 2 is a front elevation.

Similar letters of reference indicate like parts.

This invention consists in a novel arrangements of parts in an ash-sifter whereby the sieve is inclosed in a box whose top is hinged to form a cover, the lower part of the box being made a receptacle for the fine ashes and refuse.

A represents the box, which in both figures is shown closed. It is made in this example in the form of a parallelopiped. Its top is hinged behind at $c$, so that it may be raised to open the box, and a portion, A′, of the front side of the box is secured near to the front edge of the cover, so as to be raised with it, $d$ being the line on which the front side aforesaid is divided. When the cover is down, it is secured by means of a hook, $e$, which holds the parts A′ and A² of the front side of the box together. A semicircular opening is made in each of the said parts A′ and A² on the line of their separation, to form a round hole to receive the handle F of the sieve E. Two cleats, $b$, are fixed within the box along its sides to form ways for the sieve E to slide upon to and fro.

The device is wide enough to reach across the box from side to side, but only about half its length, so as to allow a great extent of movement to be given to it in a longitudinal direction. The sieve has a bottom, $e$, of wire-cloth.

The part of the box below the sieve is designated by the letter C, and is a receptacle for the fine ashes which pass the sieve. Access is had to it through a door, D, made in the back end of the box, which is so hinged at $f$ as to open upward. The cover B of the box is raised by means of a handle, $a$.

This ash-sifter may be used in any apartment, since it may be operated, if the cover is down and the door D is closed, without allowing the ashes to escape. When it is to be used, the cover is raised and the cinders to be sifted are placed in the sieve E. The cover is then fastened down close by means of its hook and the door D closed, when the sieve is pushed back and forth on the ways $b$ by means of the handle F. After the light dust and ashes have had time to settle within the box the cover may be raised and any clinkers or slate remaining in the sieve may be taken out and dropped into the part C below without occasioning any annoyance from dirt. The ashes and refuse in the part C may be afterward removed through the door D, and the sieve E can be lifted out and emptied.

A cleanly and convenient ash-sifter is very desirable to economical housekeepers, and the advantages of the construction above shown will be obvious to such persons.

I do not claim inclosing a sieve within a tight box; but,

Having thus described my invention, I claim as new, and desire to secure by Letters Patent—

The combination of the cover B, hinged at $c$, and having a downwardly-projecting front, A′, the sieve E, handle F, and back door, D, all the said parts being constructed and arranged as and for the purpose herein specified.

T. W. BROWN.

Witnesses:
DAVID A. GARDNER,
CHARLES D. CARROLL.